(12) United States Patent
Rapp

(10) Patent No.: US 6,826,817 B1
(45) Date of Patent: Dec. 7, 2004

(54) METHOD FOR BALANCING A VEHICLE DRIVESHAFT

(75) Inventor: Jeremy A. Rapp, Toledo, OH (US)

(73) Assignee: Torque-Traction Technologies, Inc., Maumee, OH (US)

( * ) Notice: Subject to any disclaimer, the term of this patent is extended or adjusted under 35 U.S.C. 154(b) by 61 days.

(21) Appl. No.: 10/308,700

(22) Filed: Dec. 3, 2002

(51) Int. Cl.⁷ .................................................. B23P 11/00
(52) U.S. Cl. ........................ 29/428; 29/901; 74/573 R; 301/5.21
(58) Field of Search ............................. 29/428, 889.61, 29/890.53, 897.2, 425, 443, 445, 455.1, 466, 506, 511, 519, 520, 521, 527.2, 527.7; 464/180, 182, 183

(56) References Cited

U.S. PATENT DOCUMENTS

| | | | | |
|---|---|---|---|---|
| 3,433,534 A | * | 3/1969 | Mercer | 301/5.22 |
| 3,659,434 A | * | 5/1972 | Wolfe | 29/407.01 |
| 3,733,923 A | | 5/1973 | Goodrich et al. | |
| 3,799,619 A | * | 3/1974 | LaBarber | 301/5.22 |
| 3,939,020 A | * | 2/1976 | Caramanian et al. | 156/64 |
| 4,060,009 A | * | 11/1977 | Wyman | 74/573 R |
| 4,418,093 A | * | 11/1983 | Gomberg et al. | 427/8 |
| 5,096,734 A | * | 3/1992 | Nikulainen et al. | 427/8 |
| 5,331,737 A | | 7/1994 | Jarvela | |
| 5,979,236 A | * | 11/1999 | Hong et al. | 73/458 |

* cited by examiner

Primary Examiner—David P. Bryant
Assistant Examiner—Stephen Kenny
(74) Attorney, Agent, or Firm—MacMillan, Sobanski & Todd, LLC (57) ABSTRACT

A method is provided for quickly and inexpensively balancing an article, such a driveshaft tube for use in a vehicular driveshaft assembly, for rotation about an axis. Initially, a balancing structure is provided that includes a chamber that contains a quantity of a first component of a balancing material. The balancing structure is secured to the article. Then, a quantity of a second component of the balancing material is disposed within the chamber so as to initiate solidification of the balancing material. Lastly, before the balancing material solidifies, the article and the balancing structure are rotated so as to cause the balancing material to move within the chamber to a position wherein the combined assembly of the article and the balancing structure are balanced for rotation. The balancing material solidifies in this position, thus permanently balancing the article for rotation.

12 Claims, 5 Drawing Sheets

METHOD FOR BALANCING A VEHICLE DRIVESHAFT

BACKGROUND OF THE INVENTION

This invention relates in general to drive train systems for transferring rotational power from a source of rotational power to a rotatably driven device. In particular, this invention relates to an improved method for rotatably balancing a driveshaft adapted for use in such a vehicular drive train system for transferring rotational power from an engine/transmission assembly to an axle assembly.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use is today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft tube to the input shaft of the axle assembly, while accommodating a limited amount of angular misalignment between the rotational axes of these three shafts.

Ideally, the driveshaft tube would be formed in the shape of a cylinder that is absolutely round, absolutely straight, and has an absolutely uniform wall thickness. Such a perfectly shaped driveshaft tube would be precisely balanced for rotation and, therefore, would not generate any undesirable noise or vibration during use. In actual practice, however, the driveshaft tube and other components of the driveshaft assembly usually contain variations in roundness, straightness, and wall thickness that result in minor imbalances when rotated at high speeds. To prevent such imbalances from generating undesirable noise or vibration when rotated during use, therefore, it is commonplace to counteract such imbalances by securing balance weights to selected portions of the driveshaft tube or other components of the driveshaft assembly. The balance weights are sized and positioned to counterbalance the imbalances of the driveshaft assembly such that it is balanced for rotation during use.

Traditionally, the balancing process has been performed with the use of a conventional balancing machine. A typical balancing machine includes a pair of fittings that are adapted to support the ends of the driveshaft assembly thereon. The balancing machine further includes a motor for rotating the driveshaft assembly at a predetermined speed. As the driveshaft assembly is rotated, the balancing machine senses vibrations that are caused by imbalances in the structure of the driveshaft assembly. The balancing machine is responsive to such vibrations for determining the size and location of one or more balance weights that, if secured to the driveshaft assembly, will minimize these imbalances. The rotation of the driveshaft assembly is then stopped to allow such balance weights to be secured to the outer surface of the driveshaft tube or other components of the driveshaft assembly in a conventional manner, such as by welding, adhesives, and the like. The driveshaft assembly is again rotated to confirm whether proper balance has been achieved or to determine if additional balance weights are required. A number of such balancing machines of this general structure and method of operation are known in the art.

Although such prior art balancing machines have been effective, this balancing process has been found to be relatively slow and inefficient. This is because each driveshaft tube must usually be rotated and measured at least two times, a first time to measure the imbalances and determine the size and location of the balance weights, and a second time to confirm that proper balance has been achieved after the balance weights have been secured thereto. This time consuming process is particularly problematic in the context of balancing vehicular driveshaft tube, which are typically manufactured in relatively large volumes. Additionally, the costs associated with obtaining and maintaining such prior art balancing machines, and to provide the skilled personnel necessary to operate same, are relatively high. Thus, it would be desirable to provide an improved method for quickly and inexpensively balancing an article, such a driveshaft tube for use in a vehicular driveshaft assembly, for rotation about an axis.

SUMMARY OF THE INVENTION

This invention relates to an improved method for quickly and inexpensively balancing an article, such a driveshaft tube for use in a vehicular driveshaft assembly, for rotation about an axis. Initially, a balancing structure is provided that includes a chamber that contains a quantity of a first component of a balancing material. The balancing structure is secured to the article. Then, a quantity of a second component of the balancing material is disposed within the chamber so as to initiate solidification of the balancing material. Lastly, before the balancing material solidifies, the article and the balancing structure are rotated so as to cause the balancing material to move within the chamber to a position wherein the combined assembly of the article and the balancing structure are balanced for rotation. The balancing material solidifies in this position, thus permanently balancing the article for rotation.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
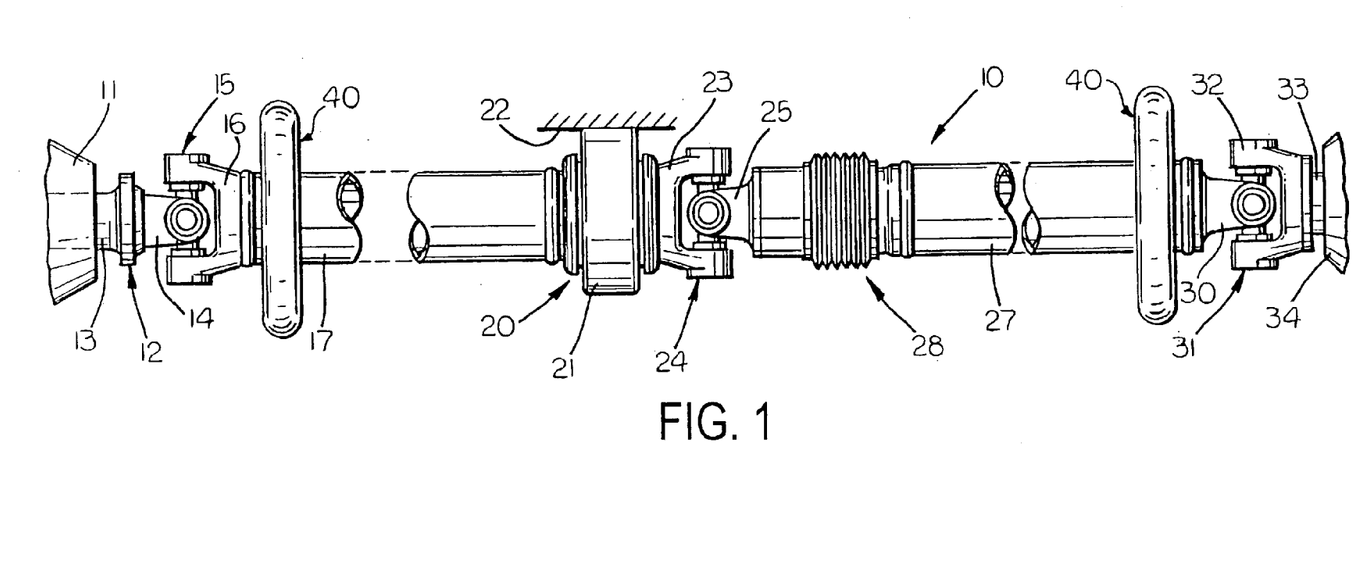
FIG. 1 is a side elevational view of a vehicle drive train system having a pair of balance structures in accordance with a first embodiment of this invention secured thereto.

Referring now to the drawings, there is illustrated in FIG. 1 a drive train system, indicated generally at 10, for a vehicle that is adapted to transmit rotational power from an engine/transmission assembly 11 to a plurality of driven wheels (not shown). The illustrated drive train system 10 is, for the most part, conventional in the art and is intended merely to illustrate one environment in which this invention may be used. Thus, the scope of this invention is not intended to be limited for use with the specific structure for the vehicle drive train system 10 illustrated in FIG. 1 or to vehicle drive train systems in general. On the contrary, as will become apparent below, this invention may be used in any desired environment for the purposes described below.

The engine/transmission assembly 11 is conventional in the art and includes an externally splined output shaft (not shown) that is connected to a first slip yoke assembly, indicated generally at 12. The first slip yoke assembly 12 is conventional in the art and includes an internally splined tubular end portion 13 that slidably engages the externally splined output shaft of the engine/transmission assembly 11. As a result, the tubular end portion 13 of the first slip yoke assembly 12 is rotatably driven by the output shaft of the engine/transmission assembly 11, but is free to move axially relative thereto to a limited extent. The first slip yoke assembly 12 further includes a yoke portion 14 that forms one part of a first universal joint assembly, indicated generally at 15. The first universal joint assembly 15 is also conventional in the art and includes a tube yoke 16 that is connected to the yoke portion 14 by a cross in a known manner. The tube yoke 16 is secured, such as by bonding or welding, to a first end of a first driveshaft section 17 for rotation therewith. The first universal joint assembly 15 thus provides a rotational driving connection between the output shaft of the engine/transmission assembly 11 and the first driveshaft section 17, while permitting a limited amount of angular misalignment therebetween. Alternatively, the output shaft of the engine/transmission assembly 11 may terminate in a conventional end yoke (not shown) which is directly connected to the cross of the first universal joint assembly 15.

The first driveshaft section 17 can extend through and be supported for rotation by a center bearing assembly, indicated generally at 20. The center bearing assembly 20 is conventional in the art and includes a rigid frame or bracket 21 that is secured to a support surface, such as a portion of a frame, chassis, or body 22 of the vehicle. The center bearing assembly 20 further includes an annular bearing (not shown) for rotatably supporting the first driveshaft section 17 therein. The first driveshaft section 17 terminates in a second end including an end yoke 23, which forms one part of a second universal joint assembly, indicated generally at 24. The second universal joint assembly 24 is also conventional in the art and includes a yoke shaft 25 that is connected to the end yoke 23 by a cross in a known manner. The yoke shaft 25 is, in turn, connected through a second slip yoke assembly, indicated generally at 28, to a first end of a second driveshaft section 27. The second universal joint assembly 24 thus provides a rotational driving connection between the first driveshaft section 17 and the second driveshaft section 27, while permitting a limited amount of angular misalignment therebetween. The structure and operation of the second slip yoke assembly 28 is conventional in the art and forms no part of this invention.

The second driveshaft section 27 terminates in a second end having a tube yoke 30 secured thereto. The tube yoke 30 forms one part of a third universal joint assembly 31. The third universal joint assembly 31 is also conventional in the art and includes a tube yoke 32 that is connected to an input shaft 33 of an axle assembly 34 by a cross in a conventional manner. The third universal joint assembly 31 thus provides a rotational driving connection between the second driveshaft section 27 and the input shaft 33 of the axle assembly 34, while permitting a limited amount of axial misalignment therebetween. The axle assembly 34 is conventional in the art and is adapted to transmit rotational power from the input shaft 33 to the driven wheels of the vehicle in a known manner.

As is well known in the art, most driveshaft tubes, such as the driveshaft sections 17 and 27, usually contain variations in roundness, straightness, and wall thickness that result in minor imbalances when rotated at high speeds. To prevent such imbalances from generating undesirable noise or vibration, first and second balance structures, indicated generally at 40, are secured to the outer surfaces of the driveshaft sections 17 and 27. The first and second balance structures 40 are provided to counterbalance the imbalances of the driveshaft sections 17 and 27 such that the drive train system 10 is balanced for rotation during use. The first and second balance structures 40 are preferably identical in structure, although such is not required. As shown in FIG. 1, the first balance structure 40 is secured to the outer surface of the first driveshaft section 17 a predetermined distance inwardly from the first end thereof (i.e., the left end of the first driveshaft section 17, when viewing FIG. 1), while the second balance structure 40 is secured to the outer surface of the second driveshaft section 27 a predetermined distance inwardly from the second end thereof (i.e., the right end of the second driveshaft section 27, when viewing FIG. 1). Preferably, the balance structures 40 are located relatively close (e.g., within about one inch to about one and one-half inches) to the associated ends of the driveshaft sections 17 and 27 to balance the driveshaft section 17 and 27. Although the illustrated embodiment shows one balance structure 40 secured to each end of the driveshaft sections 17 and 27, it will be appreciated that additional balance structures can be secured elsewhere to either or both of the driveshaft sections 17 and 27 counterbalance the amount of imbalances therein.

Figure 2:
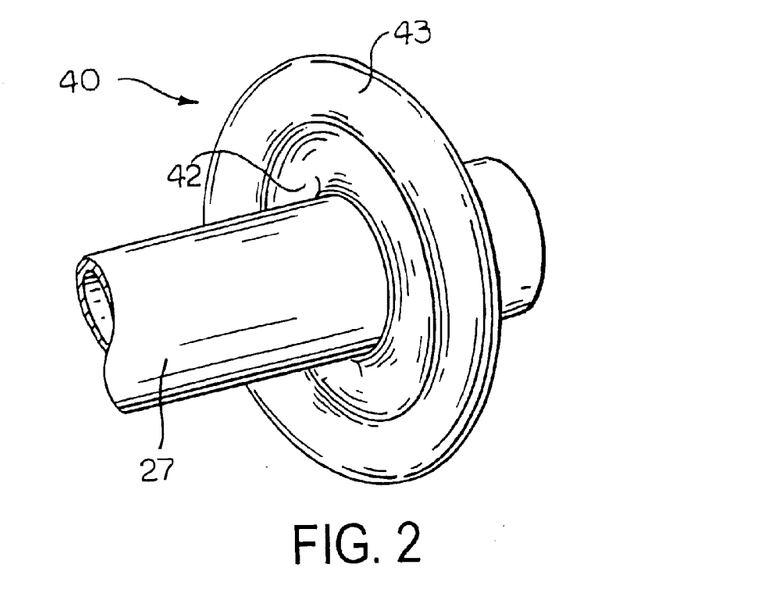
FIG. 2 is an enlarged perspective view of a portion of the vehicle drive train system illustrated in FIG. 1 showing a first side of the first embodiment of the balance structure.
Figure 3:
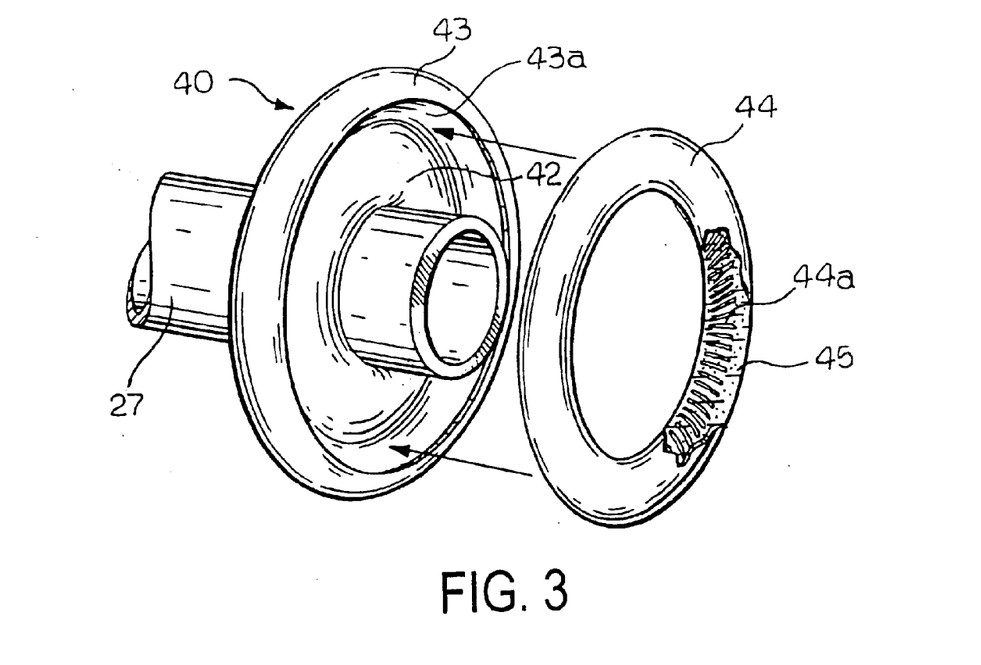
FIG. 3 is an enlarged exploded perspective view of the portion of the vehicle drive train system illustrated in FIG. 2 showing a second side of the first embodiment of the balance structure.
Figure 4:
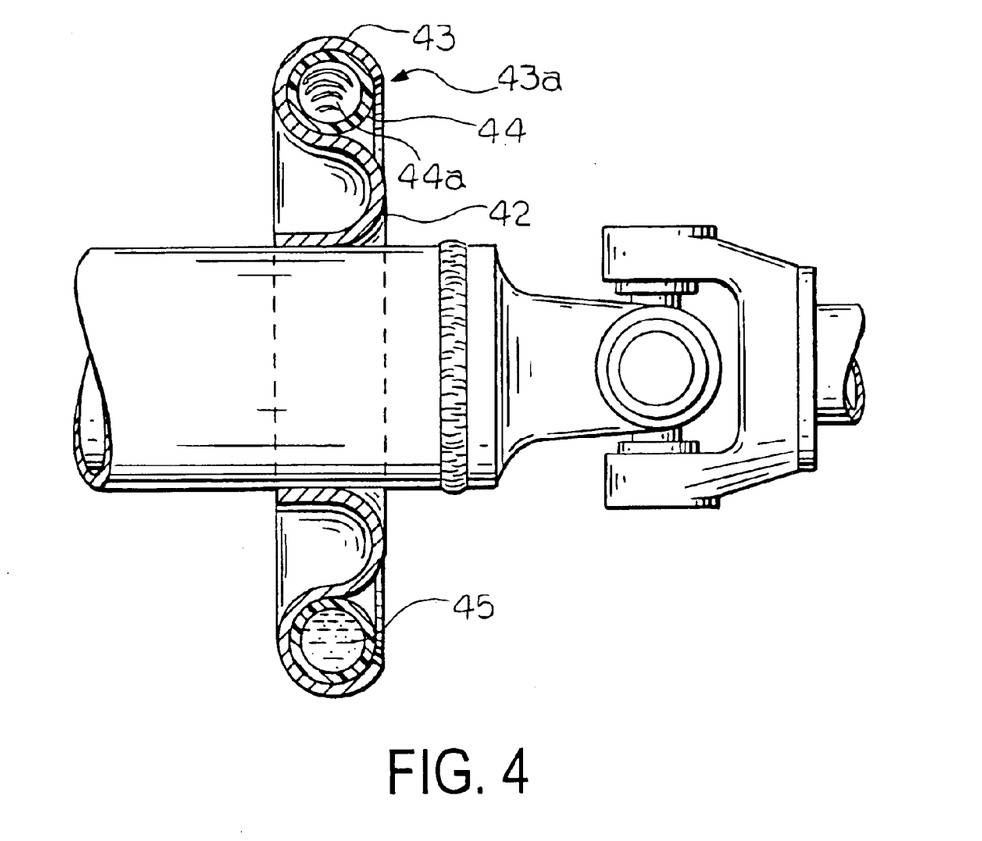
FIG. 4 is an enlarged side elevational view, partially in cross section, of the portion of the vehicle drive train system and the first embodiment of the balance structure illustrated in FIGS. 1, 2, and 3.

The structure of a first embodiment of one of the balance structures 40 is illustrated in detail in FIGS. 2, 3, and 4. As shown therein, the first embodiment of the balance structure 40 includes a mounting bracket including an inner annular bracket portion 42 and one or more outer annular cavity portions 43 positioned adjacent to and radially outwardly from the inner annular bracket portion 42. In the illustrated embodiment, the mounting bracket of the balance structure 40 is formed from a single piece of metallic material that is pressed or otherwise deformed to the desired shape such that the inner annular bracket portion 42 and the outer annular cavity portion 43 are integrally formed together. However, such is not required, and the mounting bracket of the balance structure 40 may be formed from two or more pieces of material that are joined or otherwise connected together. The mounting bracket of the balance structure 40 may be formed from any desired material or materials.

The inner annular bracket portion 42 of the mounting bracket of the balance structure 40 is adapted to be secured to the driveshaft section 27. In the illustrated embodiment, the inner annular bracket portion 42 of the mounting bracket is press fit onto the outer surface of the driveshaft section 27 in a desired location. The outer annular cavity portion 43 of the balance structure 40 receives and supports a hollow annular chamber 44. To accomplish this, the outer annular cavity portion 43 of the illustrated balance structure 40 is defined by an annular wall having a generally C-shaped cross-sectional shape, as best illustrated in FIG. 4, so as to form a captive opening, generally indicated at 43a, within which the hollow annular chamber 44 may be inserted. The captive opening 43a resists removal of the hollow annular chamber 44 from the cavity portion 43 of the balance structure 40. The cavity portion 43 is sized and positioned to support the hollow annular chamber 44 at a predetermined radial distance outwardly from the rotational axis of the driveshaft section 27. The hollow annular chamber 44 can, for example, be formed from a polymer material that can be cast or molded (e.g., injection molded) to have a desired shape.

The hollow annular chamber 44 is closed so as to retain a quantity of a balancing material 45 therein. The hollow annular chamber 44 can be partially or completely filled with the balancing material 45, as desired. The balancing material 45 contained within the hollow annular chamber 44 may be embodied as any desired material that is capable of balancing the driveshaft section 27 for rotation. For example, the balancing material 45 may be a composite material that includes a first component and a second component. The first component may be a liquid or fluid material having a quantity of relatively heavy balancing media suspended or otherwise retained therein. The balancing media can, for example, be an alloy of several metallic substances. Preferably, the balancing media is a quantity of powdered metal alloy particles that are suspended in the first component of the liquid or fluid material. Thus, the balancing media is free to move easily throughout the first component of the balancing material 45 contained within the hollow annular chamber 44. The balancing media adds mass to the balance structure 40 so as to counterbalance the imbalance in the driveshaft section 27 in the manner described below. The specific substance and quantity of balancing media used can be based on the particular application and, therefore, can vary from application to application. A variety of balancing media that can be used, as part of the material 45 is available from the Metals Division of the Mallory Alloys Group, located in the United Kingdom. The second component of the balancing material 45 is adapted to be added to the first component so as to react therewith. For example, the second component of the balancing material 45 can be injected through the wall of the hollow annular chamber 44 into the interior thereof. Alternatively, the second component of the balancing material 45 may be disposed within one or more containers (not shown) provided within the hollow annular chamber 45. The containers can be broken to release the second component into the first component. Regardless of the specific mechanism by which the second component is added to the first component, the second component of the balancing material 45 causes the first component to solidify, thus retaining the balancing media in a position that counterbalances the imbalance of the driveshaft section 27.

During a balancing operation, the balance structure 40 is initially secured to the second driveshaft section 27. During this initial step, the hollow annular chamber 44 contains only the first component of the balancing material 45. Thus, the first component of the balancing material 45 and the balancing media suspended therein are free to move throughout the hollow annular chamber 44. The hollow annular chamber 44 is preferably substantially toroidal in shape to promote the flow of the balancing material 45 circumferentially therein. When the second driveshaft section 27 is ready for balancing, the second component of the balancing material 45 is added to the first component, such as in the manner described above. Immediately thereafter, the second driveshaft section 27 is rotated at a desired speed (e.g., just above resonant frequency of vibration). The centrifugal force created by the rotation of the second driveshaft section 27 causes the balancing media contained within the balancing material 45 to be distributed throughout the hollow annular chamber 44 in such a manner that it will counterbalance any imbalance of the second driveshaft section 27. While the second driveshaft section 27 rotates a chemical reaction occurs between the first and second components of balancing material 45. Such chemical reaction causes the balancing material 45 contained within the hollow annular chamber 44 to harden, thereby permanently retaining the balancing media in position to balance the second driveshaft section 27 for rotation. If desired, a lattice or other surface irregularity (e.g., serrations, ribs, or the like), such as indicated generally at 44a, can be provided on the interior surface of the hollow annular chamber 44. The lattice 44a can be any shape that resists undesirable movement of the balancing material 45 after it has solidified.

As an alternative to using a chemical reaction to harden the balancing material 45 as discussed above, the balancing material 45 contained within the hollow annular chamber 44 can be composed of a thermosetting or thermoplastic material, such as an epoxy resin, that may or may not contain a balancing media. The hollow annular chamber 44 can be filled, partially filled, or coated with the thermosetting or thermoplastic material 45. If a thermosetting balancing material 45 is used, the second driveshaft section 27 is rotated at the desired speed to allow the liquid thermosetting balancing material 45 to be distributed throughout the hollow annular chamber 44 to rotational balance the driveshaft section 27. Then, the thermosetting balancing material 45 can be activated by an external heating source so as to cause the balancing material 45 to solidify. On the other hand, if a thermoplastic balancing material 45 is used, the second driveshaft section 27 is initially heated by the external heating source to liquefy the thermoplastic balancing material 45. Then, the second driveshaft section 27 is rotated at the predetermined speed to allow the thermoplastic balancing material 45 to be distributed throughout the hollow annular chamber 44 to rotational balance the driveshaft section 27. Then, the external heating source is removed, allowing the thermoplastic balancing material 45 to solidify.

Figure 5:
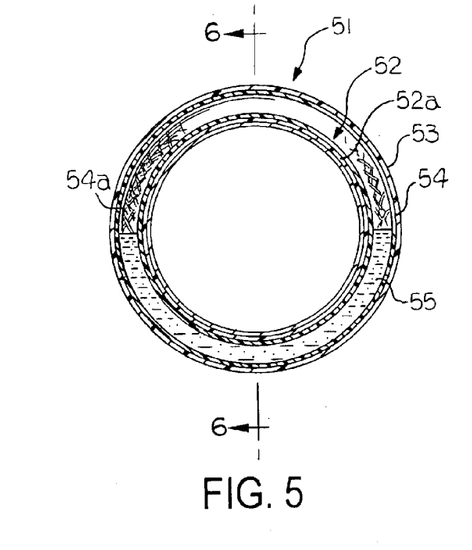
FIG. 5 is a front sectional elevational view of a portion of the vehicle drive train system illustrated in FIG. 1 having a second embodiment of a balance structure in accordance with this invention secured thereto.
Figure 6:
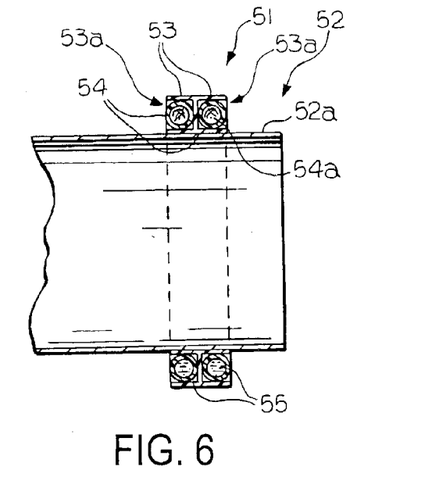
FIG. 6 is a sectional elevational view of the portion of the vehicle drive train system and the second embodiment of the balance structure taken along the line 6—6 of FIG. 5.

FIGS. 5 and 6 illustrate a second embodiment of a balance structure, indicated generally at 51, for rotatably balancing a driveshaft tube, indicated generally at 52. As shown therein, the balance structure 51 is also adapted to be secured to an outer surface 52a of the driveshaft tube 52, such as by press fitting. The second embodiment of the balance structure 51 includes two or more hollow annular cavities 53 that are provided for supporting respective hollow annular chambers 54 therein. Each of the hollow annular cavities 53 can be provided with an opening, indicated generally at 53a, through which a corresponding one of the hollow annular chambers 54 may be inserted. Each of the hollow annular chambers 54 is preferably retained in a fixed relationship with the corresponding annular cavity 53 by any conventional retaining structure (not shown). The annular cavities 53 are sized and positioned to support the hollow annular chambers 54 at a predetermined radial distance from the rotational axis of the driveshaft tube 52. The hollow annular chambers 54 are closed to retain a quantity of a balancing material 55 therein, as discussed above. As also discussed above, a lattice 54a or other irregularity (e.g., serrations, ribs, or the like) can be provided on the interior surface of the hollow annular chamber 54 to aid in retaining the balancing media in the desired location.

Figure 7:
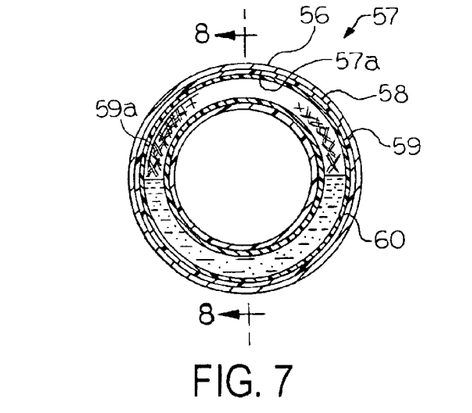
FIG. 7 is a front sectional elevational view of a portion of the vehicle drive train system illustrated in FIG. 1 having a third embodiment of a balance structure in accordance with this invention secured thereto.
Figure 8:
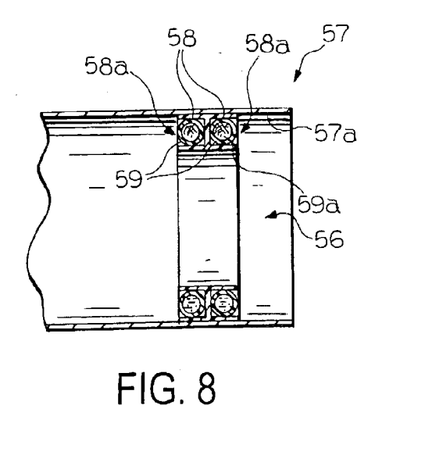
FIG. 8 is a sectional elevational view of the portion of the vehicle drive train system and the third embodiment of the balance structure taken along the line 8—8 of FIG. 7.

FIGS. 7 and 8 illustrate a third embodiment of a balance structure, indicated generally at 56, for rotatably balancing a driveshaft tube, indicated generally at 57. As shown therein, the third embodiment of the balance structure 56 is similar to the second embodiment of the balance structure 51 described above, except that the third embodiment of the balance structure 56 is adapted to be secured to an inner surface 57a of the driveshaft tube 57, such as by press fitting, for example. As described above, the balance structure 56 includes one or more annular cavities 58 that support respective hollow annular chambers 59. Each of the hollow annular cavities 58 can be provided with an opening, indicated generally at 58a, through which a corresponding one of the hollow annular chambers 59 may be inserted. Each of the hollow annular chambers 59 is preferably retained in a fixed relationship with the corresponding annular cavity 58 by any conventional retaining structure (not shown). The annular cavities 58 are sized and positioned to support the hollow annular chambers 59 at a predetermined radial distance from the rotational axis of the driveshaft tube 57. The hollow annular chambers 59 are closed to retain a quantity of a balancing material 60 therein, as discussed above. As also discussed above, a lattice 59a or other irregularity (e.g., serrations, ribs, or the like) can be provided on the interior surface of the hollow annular chamber 59 to aid in retaining the balancing media in the desired location.

Figure 9:
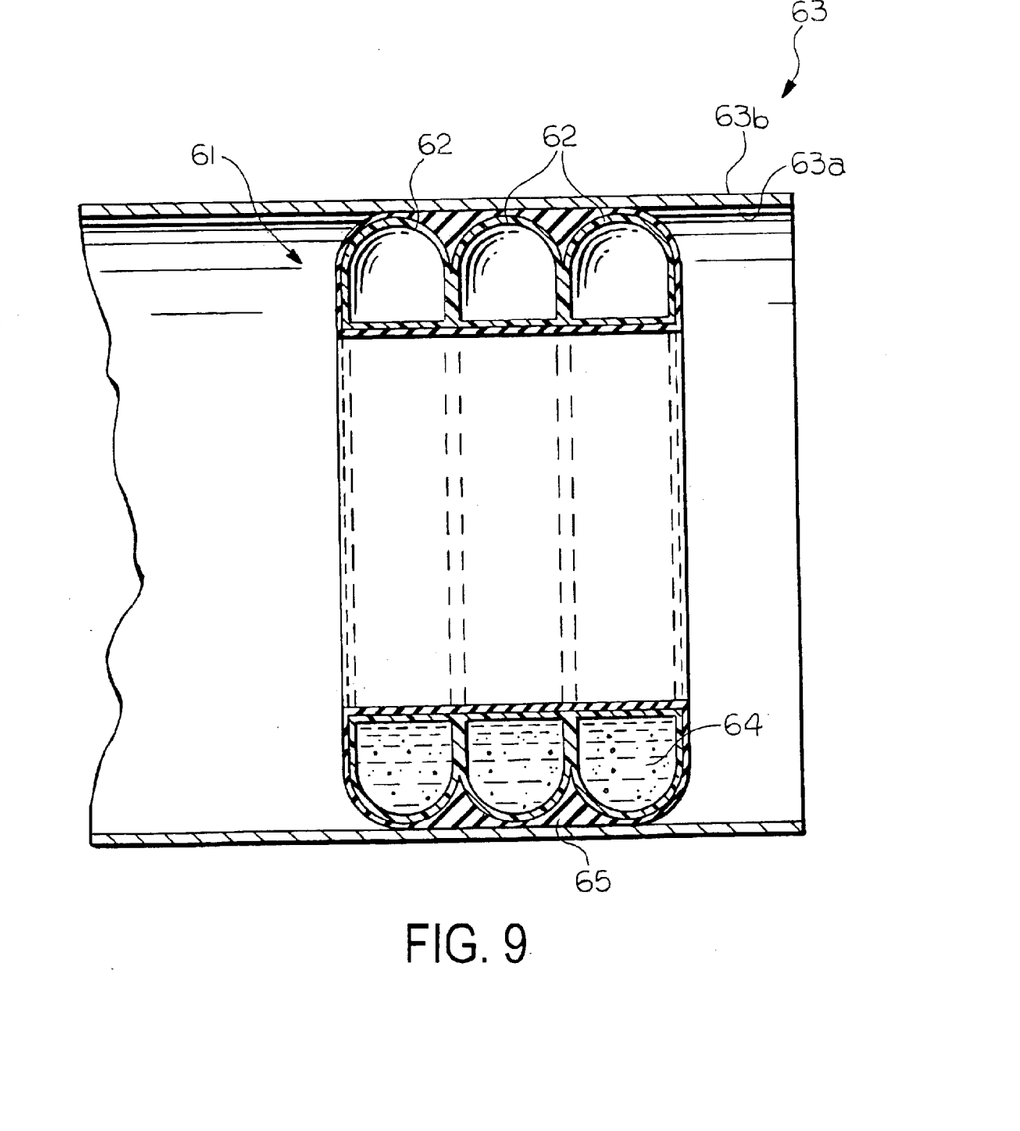
FIG. 9 is an enlarged sectional elevational view of a portion of the vehicle drive train system illustrated in FIG. 1 having a fourth embodiment of a balance structure in accordance with this invention secured thereto.

FIG. 9 illustrates a fourth embodiment of a balance structure, indicated generally at 61, for rotatably balancing a driveshaft tube, indicated generally at 63. Unlike the balance structures discussed above, the fourth embodiment of the balance structure 61 lacks a mounting bracket and a cavity for retaining an annular chamber. Rather, one or more hollow annular chambers 62 are secured directly to the driveshaft tube 63. In the illustrated embodiment, the hollow annular chambers 62 are secured to an inner surface 63a of the driveshaft tube 63. However, it will be appreciated that the hollow annular chambers 62 can alternatively be secured to an outer surface 63b of the driveshaft tube 63. The hollow annular chambers 62 are closed to retain a quantity of a balancing material 64 therein. The hollow annular chambers 62 can be formed in the manner described above. If desired, the hollow annular chambers 62 can be enclosed in a rubber material or other resilient material 65, such as a polymer foam. The resilient material 65 is compressible when the hollow annular chambers 62 are secured to the driveshaft tube 63 to produce an interference fit between the hollow annular chambers 62 and the driveshaft tube 63. The composition of the resilient material 65 is based on surface friction required between the balance structure 61 and the driveshaft tube 63 to secure the balance structure 61 to the driveshaft tube 63.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A method for balancing an article for rotation comprising the steps of:
    (a) providing an article;
    (b) providing a balancing structure that includes a chamber that contains a quantity of a first component of a balancing material;
    (c) securing the balancing structure to the article;
    (d) providing a quantity of a second component of the balancing material within the chamber so as to initiate solidification of the balancing material; and
    (e) before the balancing material solidifies, rotating the article and the balancing structure so as to cause the balancing material to move within the chamber to a position wherein the combined assembly of the article and the balancing structure are balanced for rotation.

2. The method defined in claim 1 wherein said step (a) is performed by providing a driveshaft tube for a vehicle drive train system.

3. The method defined in claim 1 wherein said step (b) is performed by providing a balancing structure that includes an annular bracket portion that engages the article and an annular cavity portion that extends from the annular bracket portion.

4. The method defined in claim 1 wherein said step (c) is performed by securing the balancing structure to an outer surface of the article.

5. The method defined in claim 1 wherein said step (a) is performed by providing a hollow article, and wherein said step (c) is performed by securing the balancing structure to an inner surface of the hollow article.

6. The method defined in claim 1 wherein said step (b) is performed by providing a plurality of balancing structures, each of which includes a chamber that contains a quantity of a first component of a balancing material.

7. The method defined in claim 6 wherein said step (c) is performed by securing each of the plurality of balancing structures to the article.

8. The method defined in claim 7 wherein said step (d) is performed by providing a quantity of a second component of the balancing material within each of the chambers so as to initiate solidification of the balancing material.

9. The method defined in claim 8 wherein said step (e) is performed by, before the balancing material solidifies, rotating the article and the balancing structures so as to cause the balancing material to move within the chambers to positions wherein the combined assembly of the article and the balancing structures are balanced for rotation.

10. The method defined in claim 1 wherein said step (b) is performed by providing the first component of the balancing material as a fluid material having a quantity of relatively heavy balancing media retained therein.

11. The method defined in claim 1 wherein said step (a) is performed by providing a balancing structure that includes a chamber having an interior surface formed with a surface irregularity.

12. A method for balancing an article for rotation comprising the steps of:
(a) providing an article;
(b) providing a balancing structure that includes a chamber that contains a quantity of a first component of a balancing material;
(c) securing the balancing structure to the article;
(d) providing a quantity of a second component of the balancing material within the chamber so as to react with the first component and thereby to initiate solidification of the balancing material; and
(e) before the balancing material solidifies rotating the article and the balancing structure so as to cause the balancing material to move within the chamber to a position wherein the combined assembly of the article and the balancing structure are balanced for rotation.

* * * * *